E. M. SCOVILLE.
VALVE.
APPLICATION FILED DEC. 26, 1914.
1,161,257.
Patented Nov. 23, 1915.
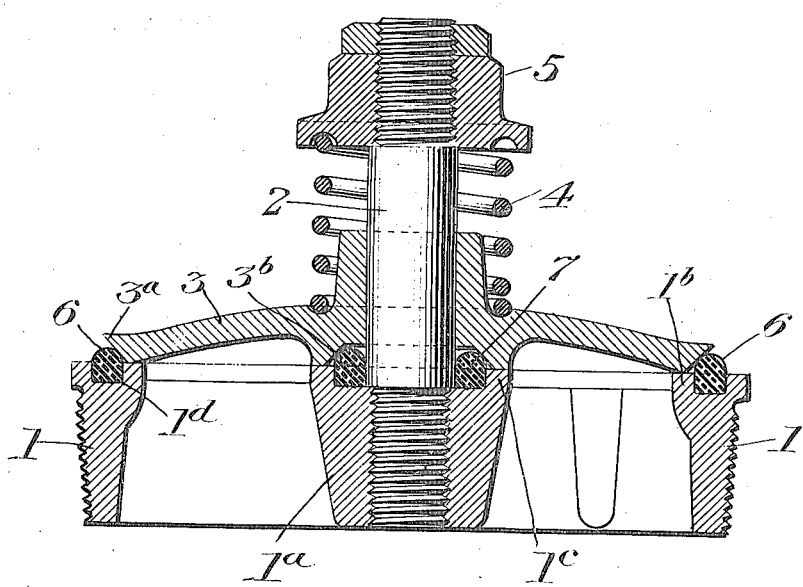

UNITED STATES PATENT OFFICE.

EUGENE M. SCOVILLE, OF WAIPAHU, TERRITORY OF HAWAII.

VALVE.

1,161,257.  Specification of Letters Patent.  Patented Nov. 23, 1915.

Application filed December 26, 1914. Serial No. 879,138. REISSUED

*To all whom it may concern:*

Be it known that I, EUGENE M. SCOVILLE, a citizen of the United States, residing at Waipahu, county of Honolulu, Territory of Hawaii, have invented certain new and useful Improvements in Valves; and I do hereby declare the following to be a full, clear, and exact description of the invention, such as will enable others skilled in the art to which it appertains to make and use the same.

This invention relates to improvements in valves, and is particularly applicable to pump valves.

The ideal valve, especially for high pressure pumps, is unquestionably one which seats metal to metal, provided that it can be kept tight with a minimum of trouble and expense.

Valves which depend for their tightness upon a seat of compressible material in conjunction with a pressure exerted upon the valve proper to force it to a tight contact with the compressible seat, are necessarily short lived, and particularly so when working under high pressures and at high speeds.

Valves in which a flexible material, such as leather, is attached to the valve proper, for the purpose of sealing the valve, are objectionable, for the upward flow of the fluid discharged through the valve is more or less obstructed thereby and the life of such material is short.

The present invention contemplates a valve which seats metal to metal and is not dependent upon the pressure on the valve proper for its tightness and effectiveness. It is provided with a ring or rings of easily compressible material, such as soft rubber for example, inserted in a groove or grooves in the valve casing contiguous to the seat or seats. The edge or edges of the valve proper are beveled and come in fairly close contact with the ring or rings when the valve is seated. If there is any tendency to leak, due for example to an imperfect fit or a damaged seat, the action of the fluid in attempting to escape through the same forces the ring into the V-shaped groove, formed by the junction of the beveled edge of the valve with the top of the casing adjacent to the seat, and thereby seals the joint. The beveling of the valve also gives the advantage of offering less obstruction to the upward flow of the fluid when leaving the valve. This is of considerable importance, especially so when the valves are set closely together. With the ordinary type of valve the fluid is deflected by the valve itself and is discharged against the fluid discharged from the adjacent valves, which causes the formation of objectionable eddies and impedes the upward flow of the fluid.

The invention comprises, therefore, a valve having a metal casing, a metal valve slidable on a stud or stem in the casing, a spring adapted to force the valve toward the casing, said valve adapted to seat on the casing metal to metal and having a beveled edge, and a ring of compressible material in a groove in the casing adjacent to and surrounding the seat and adapted to be forced by the pressure of the fluid against the beveled edge of the valve when the fluid attempts to escape through the joint between the valve and the seat, and thereby seal the joint. To prevent a leak between the valve and the stem, the valve may also seat against the casing metal to metal around the stem and be beveled adjacent to the stem, and a ring of compressible material be inserted in a groove in the casing surrounding the stem adapted to be forced against the beveled edge of the valve by the pressure of the escaping fluid and thus seal the joint contiguous to the stem.

When the valve is not in operation, it is possible to insert a piece of paper between the beveled edge of the valve and the ring. As the valve thus seats metal to metal on the body or casing and not on the compressible ring or rings, the beveled edge or edges of the valve proper only coming in fairly close contact with the ring or rings, there is very little wear on the latter, and in case of renewal they are easily and cheaply replaced. Valves of the construction contemplated are, therefore, not dependent upon the pressure on the valve proper for their tightness and effectiveness.

The accompanying drawing, forming a part of this specification, is a sectional view through the middle of a pump valve embodying a preferred form of my invention.

Referring to the drawing, 1 represents the body or casing of the valve, which is externally threaded for screwing into the body or barrel of the pump. The stud or stem 2 is screwed into the central hub $1^a$ of the casing 1. The valve proper 3 is slidable on the stem 2 and seats metal to metal on the seat $1^b$ of the casing 1 and also on the seat 1ᶜ of the hub 1ᵃ. The spring 4, interposed between the valve 3 and the nut 5 on the stem 2, forces the valve 3 toward the casing 1. The valve 3 is beveled at its outer edge 3ᵃ and also at its inner edge 3ᵇ near the stem 2, as shown. The ring 6, of soft rubber or other compressible material, is inserted in and projects above the groove 1ᵈ adjacent to the seat 1ᵇ and surrounding the same. The ring 7 is similarly inserted in the groove 1ᵉ in the hub 1ᵃ of the casing 1 and surrounds the stem 2, as shown.

In practice, valves of this construction, having four rings each, have been in continuous operation in a Riedler pump for several months working night and day against a pressure of two hundred and twenty-five pounds per square inch, opening on an average of sixty times per minute, and are absolutely tight and efficient.

It is obvious that the construction could be reversed from that described, by beveling the casing instead of the valve and inserting the ring in a groove in the valve instead of in the casing, but such an arrangement is not desirable, one reason being that the discharge upward of the fluid is obstructed due to the increased size of the valve proper which is necessary in order to provide the groove for the ring.

I claim:

1. A valve comprising, a metal casing provided with a stem, a metal valve slidable on the stem, said valve adapted to seat on the casing metal to metal and provided with a beveled edge, and a ring of compressible material in a groove in the casing adjacent to and surrounding the seat but so positioned as not to be compressed by the valve, said ring of compressible material adapted to be forced by the pressure of the fluid against the beveled edge of the valve when the fluid attempts to escape through the joint between the seat and the valve, for the purpose described.

2. A valve comprising a valve seat and a valve adapted to seat directly on said seat, said seat having a circular recess adjacent to the valve, and a ring of compressible material positioned in said recess and adapted to be forced by the pressure of the fluid against an adjacent surface of the valve when the fluid attempts to escape by the valve but so positioned that it will not be compressed by the valve itself.

3. A valve comprising a valve seat and a valve adapted to seat directly on said seat and having a beveled edge, a gasket of compressible material associated with said seat and adapted to be forced by the pressure of the fluid against said beveled edge of the valve but so positioned that it will not be compressed by the valve itself.

In testimony whereof I affix my signature, in presence of two witnesses.

EUGENE M. SCOVILLE.

Witnesses:
W. E. JAMES,
ROBT. J. PRATT.